United States Patent [19]
Morley

[11] Patent Number: 4,912,410
[45] Date of Patent: Mar. 27, 1990

[54] APPARATUS FOR MEASURING THE THICKNESS OF AN ELECTRICALLY NON-CONDUCTIVE MATERIAL ON A METALLIC BASE

[75] Inventor: Edward J. Morley, West Challow, England

[73] Assignee: BNF Metals Technology Centre, Oxfordshire, England

[21] Appl. No.: 251,085

[22] Filed: Sep. 29, 1988

[30] Foreign Application Priority Data

Sep. 29, 1987 [GB] United Kingdom ................. 8722871

[51] Int. Cl.⁴ .......................... G01B 7/10; G01R 33/12
[52] U.S. Cl. ...................................... 324/230; 73/37.6; 73/865.8; 324/262
[58] Field of Search ................................ 324/206–208, 324/228–231, 234–236, 239, 262; 73/37.5, 37.6, 37.7, 865.8

[56] References Cited

U.S. PATENT DOCUMENTS

| | | | |
|---|---|---|---|
| 3,402,603 | 9/1968 | Hollister et al. | 73/37 |
| 3,528,002 | 9/1970 | Dunlavey | 324/231 |
| 3,610,024 | 10/1971 | Honjo et al. | 73/37.5 |
| 3,818,327 | 6/1974 | Alexander | 324/231 |
| 3,857,095 | 12/1974 | Mitchie et al. | 324/230 X |
| 3,884,076 | 5/1975 | Studer | 324/230 X |
| 4,107,606 | 8/1978 | Typpo et al. | 324/229 |
| 4,647,855 | 3/1987 | Berglund | 324/229 X |
| 4,742,299 | 5/1988 | Stone | 324/230 |

Primary Examiner—Reinhard J. Eisenzopf
Assistant Examiner—Warren S. Edmonds
Attorney, Agent, or Firm—Wenderoth, Lind & Ponack

[57] ABSTRACT

An apparatus for measuring the thickness of a coating of, for example, paint or other electrically non-conductive material on a metallic base comprises a sensor head housing an electrical measuring coil and supported above the coating on a cushion of air. The air is supplied at a constant predetermined pressure to nozzles carried by the sensor head, and a constant force urging the sensor head towards the surface of the material is yieldably applied to the sensor head through a spring.

5 Claims, 1 Drawing Sheet

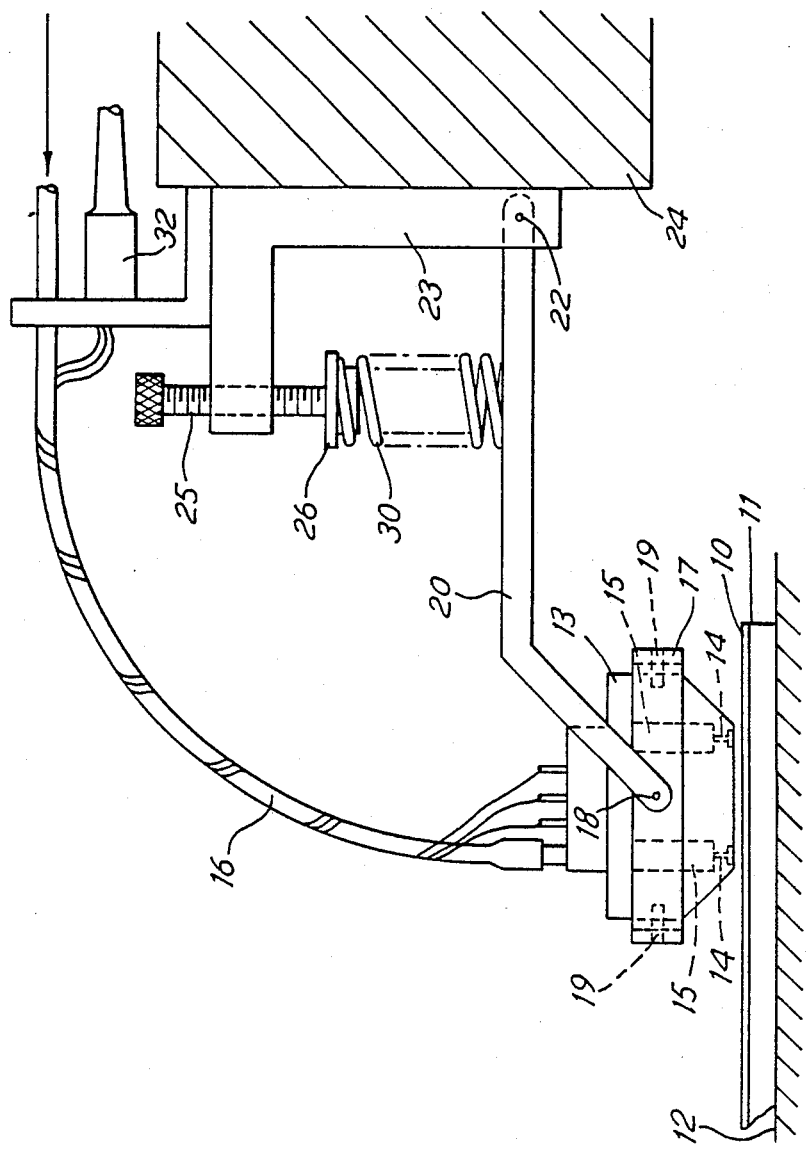

APPARATUS FOR MEASURING THE THICKNESS OF AN ELECTRICALLY NON-CONDUCTIVE MATERIAL ON A METALLIC BASE

FIELD OF THE INVENTION

This invention relates to measuring apparatus and is more particularly concerned with apparatus for measuring the thickness of an electrically non-conductive coating on a metal base.

SUMMARY OF THE INVENTION

According to this invention there is provided apparatus for measuring the thickness of an electrically non-conductive material on a metallic base, comprising a sensor head housing an electrical measuring coil and carrying one or more air nozzles, means for supplying air at a predetermined pressure to said nozzle or nozzles to support the sensor head on a cushion of air over the surface of said material, and means yieldably urging the sensor head towards the surface of the material with a constant force.

The means yieldably urging the sensor head towards the surface of the material may be a weight but may alternatively be a resilient means such as an air spring or a mechanical spring. The spring may operate on the sensor head through a lever arm effective to apply to the sensor head only a predetermined proportion of the spring force.

According to a preferred feature of the invention, said constant force is applied to the sensor head through a connection permitting universal pivotal movement of the sensor head.

BRIEF DESCRIPTION OF THE DRAWING

The invention will now be described in more detail with reference by way of example to the accompanying diagrammatic drawing showing a measuring apparatus according to the invention.

DESCRIPTION OF THE PREFERRED EMBODIMENT

The drawing shows an apparatus for measuring the thickness of an electrically non-conductive coating 10, e.g. paint, on a metallic strip 11 e.g. of aluminum, the strip being fed continuously through the apparatus. The strip is carried on a horizontal support 12 which may be fixed but which is preferably an endless moving strip supported by rollers and under sufficient tension to ensure a flat support surface. The strip and its rollers may be part of the paint line or may be an extension thereof. Above the support 12 is a sensor head 13 housing a measuring coil (not shown). A number of air nozzles 14 open to the bottom face of the sensor head and communicate through respective vertical passages 15 with a chamber (not shown) to which air at a constant pressure e.g. 20 psi (1.4 kg/cm$^2$) is supplied through a very flexible pipe 16.

The sensor head is pivotally suspended by two horizontal coaxial pivot pins 19 from a surrounding ring 17 which is in turn suspended by two horizontal coaxial pivot pins 18 from the free ends of two parallel spaced lever arms 20. The axis defined by pins 19 is at right angles to the axis defined by pins 18, so that the sensor head 13 is connected to the lever arms 20 by a universal pivot mounting. The opposite ends of the parallel lever arms 20 are pivotally connected at 22 to a bracket 23 secured to a supporting structure 24. Bracket 23 has a projecting limb formed with a screw-threaded hole through which extends a vertical screw 25 having a spring support 26 fastened to its lower end. A helical compression spring 30 is mounted on a seating disposed between and secured to the two lever arms 20 and has its upper end attached to the spring support 26, so that the screw 25 enables the spring force applied to the lever arms and, through the lever arms, to the sensor head 13 to be adjusted for a given position of the arms. Means (not shown) is provided for limiting the extent of downward movement of the sensor head.

The supporting structure is preferably mounted for movement horizontally across the width of the strip.

In the illustrated construction electric leads 31 connected to the measuring coil are wound about the flexible air tube, and are connected at their other ends to a plug socket 32 associated with the control circuit (not shown).

In operation, the spring 30 presses the sensor head towards the surface of the workpiece 10, 11 with a constant force, but the pressure of the air flow through the nozzles 14 causes the sensor head to be supported a constant distance above the coated surface of the workpiece on a cushion of air. An electrical response is however produced in the measuring coil which is dependent upon the distance of the coil from the metal strip 11, so that any variation of the thickness of the coating causes a corresponding shift of the sensor head which then causes a change in the electrical response in the measuring coil. This change is a measure of the thickness of the coating, and the apparatus can be calibrated appropriately for constant values of the spring force and air pressure to provide a reading of the thickness of the coating, using standard methods.

I claim:

1. An apparatus for measuring the thickness of an electrically non-conductive material on an electrically conductive base, said apparatus comprising:

a support;

a sensor head having a surface for facing the electrically non-conductive material, said sensor head including therein an electrical measuring coil for measuring the thickness of the electrically non-conductive material;

a universal connection means between said support and said sensor head for enabling universal pivoting movement of said sensor head relative to said support;

an air chamber in said sensor head;

a plurality of air nozzles in said sensor head opening onto said surface of said sensor head and communicating with said air chamber;

means for supplying air at a predetermined pressure to said air chamber, thus supplying said nozzles with air to support said sensor head on a cushion of air over the surface of the electrically non-conductive material; and means connected to said universal connection means for yieldably urging said sensor head towards the surface of the electrically non-conductive material with a constant force.

2. The apparatus as set forth in claim 1, and further comprising:

means for enabling movement of said support in a lateral traverse parallel to said surface of said sensor head.

3. The apparatus as set forth in claim 1, wherein:

said means for yieldably urging said sensor head towards the surface of the material comprises a weight.
4. The apparatus as set forth in claim 1, wherein:
said means for yieldably urging said sensor head toward the surface of the material comprises a spring.
5. The apparatus as set forth in claim 4, wherein: said means for yieldably urging comprises a lever arm connected between said support and said universal connection means, said spring yieldably urging said sensor head toward the surface of the material by engaging said lever arm at a point between said sensor head and said support so as to apply to said sensor head only a predetermined proportion of the force exerted by the spring.

* * * * *